(12) United States Patent
Seungshik Thompson et al.

(10) Patent No.: US 11,321,206 B2
(45) Date of Patent: May 3, 2022

(54) CLUSTER FEATURE ACTIVATION AND UPDATE SYSTEM

(71) Applicant: EMC IP Holding Company LLC, Hopkinton, MA (US)

(72) Inventors: Adam Marshall Seungshik Thompson, Bremerton, WA (US); Carter Smithhart, Renton, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 186 days.

(21) Appl. No.: 16/749,727

(22) Filed: Jan. 22, 2020

(65) Prior Publication Data

US 2021/0224174 A1 Jul. 22, 2021

(51) Int. Cl.
*G06F 11/30* (2006.01)
*G06F 9/445* (2018.01)
*G06F 9/451* (2018.01)
*G06F 21/10* (2013.01)

(52) U.S. Cl.
CPC ...... *G06F 11/3006* (2013.01); *G06F 9/44505* (2013.01); *G06F 9/451* (2018.02); *G06F 11/3034* (2013.01); *G06F 21/105* (2013.01)

(58) Field of Classification Search
CPC .. G06F 11/3006; G06F 9/451; G06F 9/44505; G06F 11/3034; G06F 21/105; G06F 9/5072; H04L 63/0428
See application file for complete search history.

(56) References Cited

U.S. PATENT DOCUMENTS

| | | | | |
|---|---|---|---|---|
| 8,881,146 B2* | 11/2014 | Padmanabhuni | ... | G06F 9/45558 718/1 |
| 8,904,174 B2* | 12/2014 | Fried | ... | H04L 63/0428 713/168 |
| 9,135,409 B2* | 9/2015 | Xia | ... | G06F 21/10 |
| 9,430,649 B2* | 8/2016 | Ide | ... | G06F 21/44 |
| 2005/0226059 A1* | 10/2005 | Kavuri | ... | G06F 3/0607 365/189.05 |
| 2016/0073217 A1* | 3/2016 | Schmedling | ... | H04W 12/04 726/29 |
| 2016/0105323 A1* | 4/2016 | Haeupler | ... | H04L 47/70 709/224 |
| 2017/0359243 A1* | 12/2017 | Deuri | ... | H04L 45/74 |
| 2020/0044868 A1* | 2/2020 | Vakulenko | ... | H04L 9/3213 |
| 2020/0125462 A1* | 4/2020 | Zhu | ... | G06F 11/2023 |
| 2020/0272709 A1* | 8/2020 | Terry | ... | H04L 63/20 |
| 2020/0296158 A1* | 9/2020 | Haldar | ... | H04L 41/0806 |
| 2020/0394282 A1* | 12/2020 | Wang | ... | G06F 21/105 |
| 2021/0132957 A1* | 5/2021 | Wang | ... | G06F 9/5072 |

* cited by examiner

*Primary Examiner* — Andrew L Tank
(74) *Attorney, Agent, or Firm* — Amin, Turocy & Watson, LLP

(57) ABSTRACT

Described herein are systems and techniques to manage activation of software features deployed at computing clusters. Features can be initially activated at a cluster using cluster licensing management components and processes described herein. After initial activation, the disclosed cluster licensing management components and processes can update licenses for the features as may be desired in view of changes to the cluster configuration.

20 Claims, 10 Drawing Sheets

CLUSTER FEATURE ACTIVATION AND UPDATE SYSTEM

TECHNICAL FIELD

The subject disclosure relates generally to computing clusters, namely, groups of connected, collectively managed, cooperating computing devices.

BACKGROUND

Managing licensing of software features for computing clusters can be complex and burdensome. A cluster can be configured with numerous different features, some of which can require separate licenses. Moreover, some of the different features can be subject to different licenses under different circumstances. For example, a feature can have a first license type for a cluster equipped with a small number of computing devices, and a second license type for a cluster equipped with a large number of computing devices.

An example process by which a cluster administrator can activate a license includes, first, the administrator initiates a license activation at the cluster; second, the administrator selects a feature they wish to activate at the cluster; third, the administrator confirms their selection to generate a license activation file for the selected feature; fourth, the administrator downloads the activation file to a computing device; fifth, the administrator uploads the activation file to a licensing portal and submits a request for a license file; sixth, at a later time, the requested license file is sent to the administrator by email; seventh, the administrator uploads the emailed license file to the cluster and installs it.

Problematically, even after the administrator has completed the above example feature licensing process, if the cluster changes, e.g., by adding computing devices or otherwise changing cluster hardware, the administrator can be required to re-license the software feature by again following the example feature licensing process. Also, it can be appreciated that undertaking such a feature licensing process for multiple separately licensed features can be unduly time consuming and difficult.

The above-described background is merely intended to provide a contextual overview of some current issues and is not intended to be exhaustive. Other contextual information may become further apparent upon review of the following detailed description.

DETAILED DESCRIPTION

Figure 1:
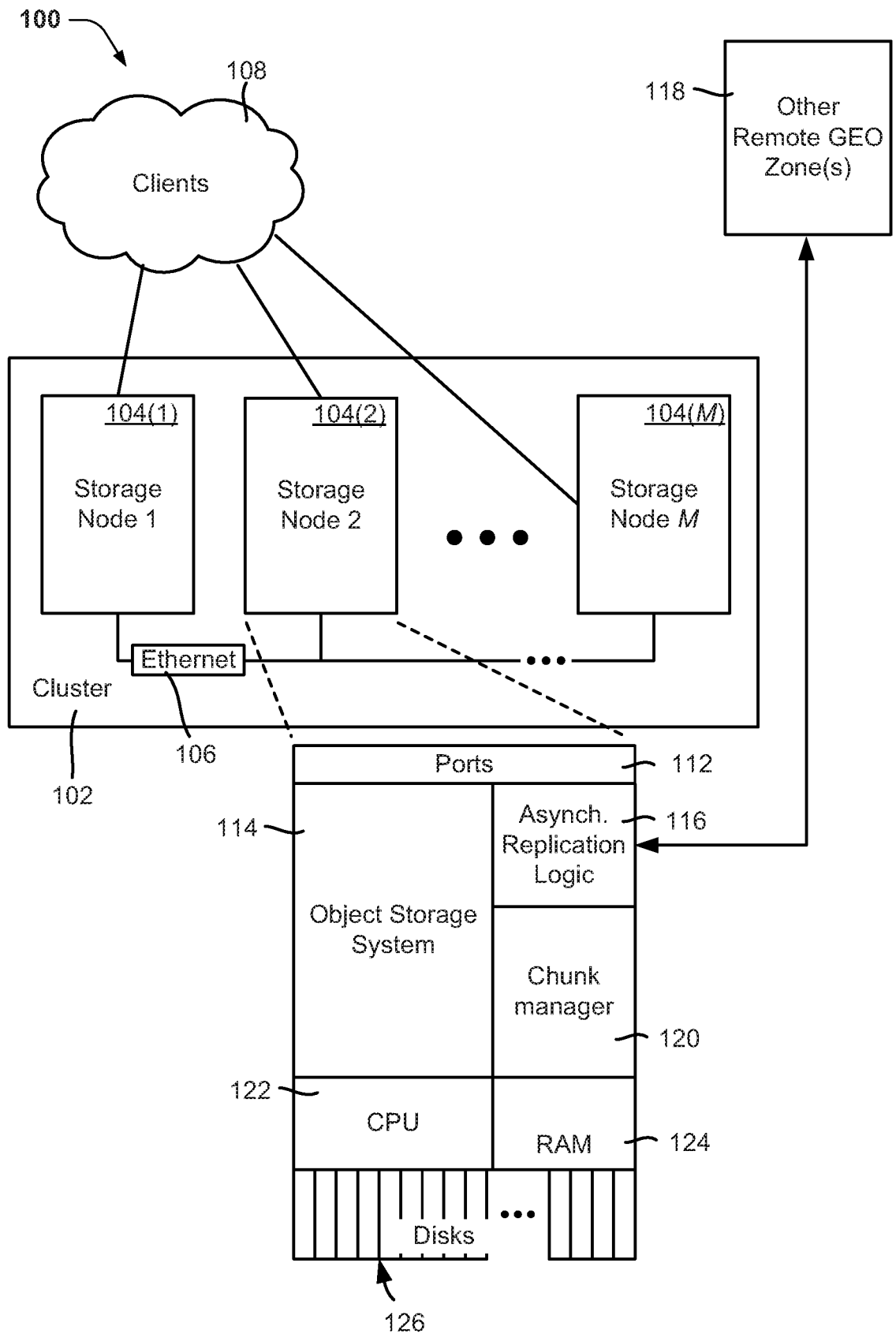
FIG. 1 illustrates an example part of a cloud data storage system, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to a cluster feature activation and update system. Software features can be initially activated at a cluster using cluster licensing management components and processes described herein. After initial activation, the disclosed cluster licensing management components and processes can update licenses for the software features as may be desired in view of any changes to the cluster configuration. Further aspects and embodiments of this disclosure are described in detail herein.

Example systems and methods disclosed herein, in one or more embodiments, relate to cloud storage systems, such as, but not limited to an ECS™ platform. The ECS™ platform combines the cost advantages of commodity infrastructure with the reliability, availability and serviceability of traditional arrays.

With regard to the ECS™ platform in general, ECS™ can comprise clusters of nodes that deliver scalable public cloud services with the reliability and/or control of a private-cloud infrastructure. Moreover, the ECS™ platform comprises a scale-out, shared-nothing object storage, which employs a microservices architecture pattern. The ECS™ platform can support storage, manipulation, and/or analysis of unstructured data on a massive scale. As an example, ECS™ can support mobile, cloud, big data, content-sharing, and/or social networking applications. ECS™ can be deployed as a turnkey storage appliance or as a software product that can be installed on a set of qualified servers and/or disks.

The ECS™ scale-out and geo-distributed architecture is a cloud platform that can provide the following example features: (i) lower cost than public clouds; (ii) unmatched combination of storage efficiency and data access; (iii) anywhere read/write access with strong consistency that simplifies application development; (iv) no single point of failure to increase availability and performance; and (v) universal accessibility that eliminates storage silos and inefficient extract, transform, load (ETL)/data movement processes; etc.

In an aspect, ECS™ need not rely on a file system for disk capacity management. Instead, ECS™ can partition disk space into a set of blocks of fixed size called chunks (e.g., having a chunk size of 128 MB). User data can be stored in these chunks and the chunks can be shared. Typically, a chunk can comprise fragments of several different user objects. The chunk content can be modified in an append-only mode. When a chunk becomes full, it can be sealed and the content of a sealed chunk is immutable. In a further aspect, a data chunk can comprise a plurality of object segments having a size of 2 MB that are appended in the data chunk. Thus, a data chunk of size 128 MB can have 64 object segments appended together. In general operation, a read request comprises a request to read (e.g., extract) a single object segment.

In another aspect, ECS™ provides a cloud storage system that supports geographically distributed setups comprising two or more zones. Each zone can include a cluster of multiple data node devices which are administered by a cluster controller. The corresponding feature is called GEO. GEO can be used to provide additional protection of user data by means of replication. The replication mechanism can work at the chunks level, although it can also serve object-oriented goals. In an aspect, a chunk with data can be replicated to multiple remote zones. ECS™ can use GEO erasure coding techniques to minimize capacity overhead associated with GEO data protection. Although the systems and methods disclosed herein may be described with respect to object storage systems, the subject specification is not limited to object storage systems and can be utilized for most any storage systems.

The GEO system is capable of employing, e.g., a replication to single site mode, a replication to all sites mode, or a replication to one or more regions mode depending on geographical considerations (e.g., distance and government rules on storing data), site or region storage size considerations (e.g., a site limited to storing 100 million data chunks). A replication to one site mode comprises replicating a backup copy of a data chunk at a single zone. For example, the data chunk is created at a primary zone and a backup is stored at secondary zone. A replication to all sites mode comprises replicating a backup copy of a data chunk at every zone within the GEO system. A replication to one or more regions mode can comprise replicating a data chunk to one or more regions. The data chunk can be replicated at, e.g., a single respective zone of each of multiple respective regions. The advantage of replicating at region level is that it provides greater reliability of accessing the data chunk during zone failure while storing the data chunks at fewer zones, thereby reducing storage resources. In some embodiments, chunks containing data associated with a particular application can be replicated in order to replicate the corresponding objects of the application.

ECS™ supports temporary unavailability of GEO zones. When a zone is temporarily unavailable we say that the zone is in temporary site outage (TSO) mode. Support for TSOs can be accomplished in part through object management. Geographically distributed ECS™ setups maintain a global namespace and assure strong consistency for user data. This is achieved via defining a primary zone for each object. Normally, the primary zone is a zone that created an object. Then, we say that the primary zone owns the object or that the primary zone is the owner of the object. All requests related to the object can be handled by the zone that owns it.

When a zone that owns some object enters TSO mode, a new owner zone can be elected for the object. Note that every available zone of the GEO setup can become the owner. In the general case, a new object owner can facilitate update of the object. This means a potential conflict after the original owner of the object becomes available again. The system runs through a reconciliation phase to resolve conflicts. The ECS's conflict resolution strategy is very simple: choose a latest object update and discard potentially conflicting object updates.

FIG. 1 shows part of a cloud data storage system such as ECS™ comprising a cluster 102 of data node devices, referred to in FIG. 1 as storage nodes 104(1), 104(2) . . . 104(M). Each storage node 104(1), 104(2) . . . 104(M) can comprise a computing device optionally equipped to host multiple virtual machines (not shown in FIG. 1). Storage nodes 104(1), 104(2) . . . 104(M) can be configured to serve objects in response to requests from clients 108. Furthermore, typically one of the nodes 104(1), 104(2) . . . 104(M) can host a cluster controller virtual machine (not shown in FIG. 1), making that node the cluster controller node which administers the cluster 102. The nodes 104(1), 104(2) . . . 104(M) can be coupled to each other via a suitable data communications link comprising interfaces and protocols such as, but not limited to, Ethernet block 106.

Clients 108 can send data system-related requests to the cluster 102, which in general can be configured as one large object namespace. There can be on the order of billions of objects maintained in a cluster 102. To this end, a node such as the node 104(2) generally comprises ports 112 by which clients 108 connect to the cloud storage system. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), can include an instance of an object storage system 114 and data services. In general, and in one or more implementations, e.g., ECS™, disk space can be partitioned into a set of large blocks of fixed size called chunks and user data can be stored in chunks. Chunks are shared, that is, one chunk can contain segments of multiple user objects; e.g., one chunk can contain mixed segments of some number of (e.g., three) user objects. A chunk manager 120 can be utilized to manage the chunks and their protection.

Each node, such as the node 104(2), can include a CPU 122, RAM 124, and storage devices such as disks 126. RAM 124 and disks 126 can comprise, e.g., volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

For a cluster that comprises a "GEO" zone of a geographically distributed storage system, at least one node, such as the node 104(2), can include or be coupled to reference tracking asynchronous replication logic 116 that synchronizes the cluster 102 with other remote GEO zones, such as 118.

Figure 2:
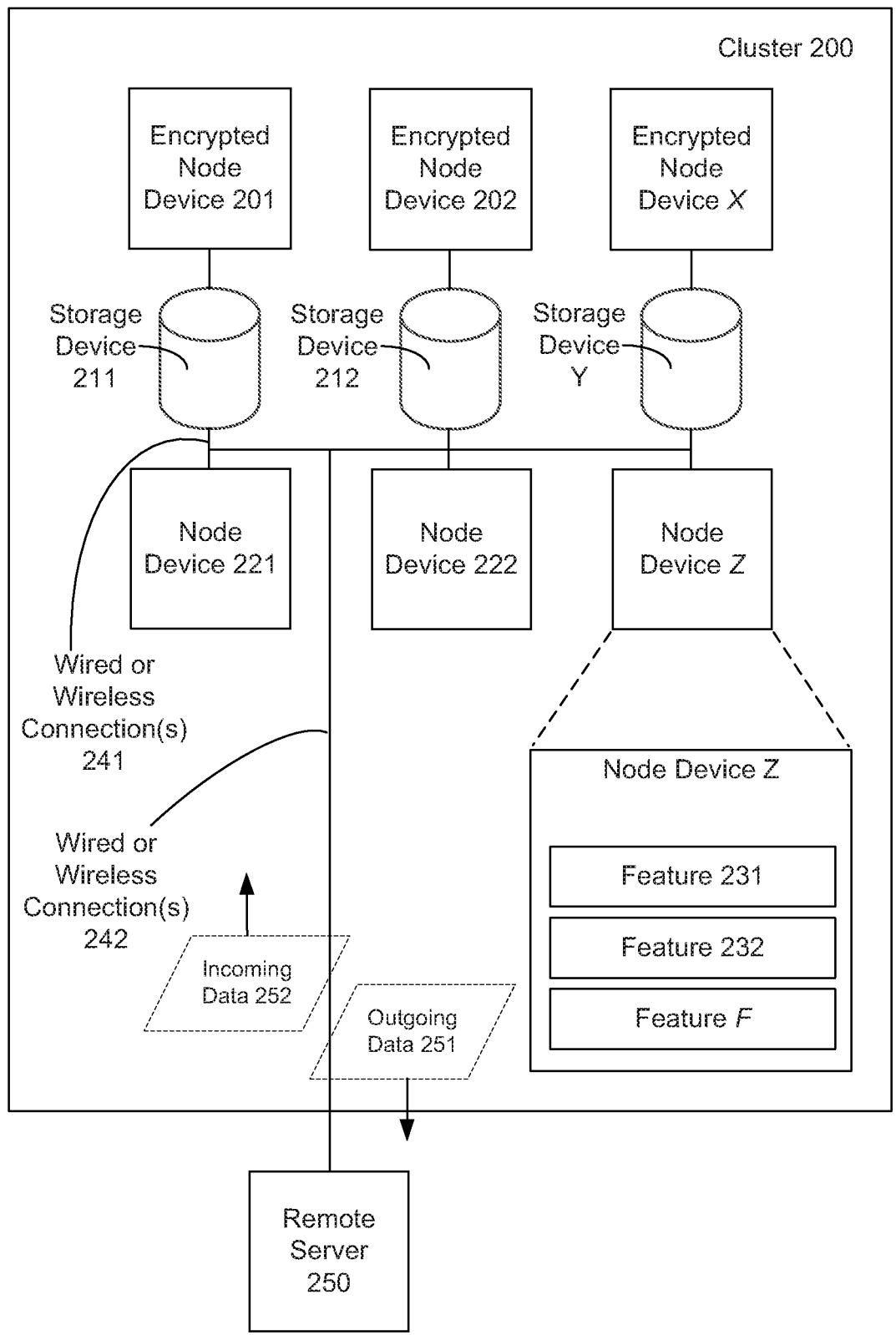
FIG. 2 illustrates an example cluster of computing devices, in accordance with one or more embodiments described herein.

FIG. 2 illustrates an example cluster of computing devices, in accordance with one or more embodiments described herein. FIG. 2 includes example cluster 200. The cluster 200 includes a variety of computing devices and other hardware, including, e.g., encrypted node devices, storage devices, and node devices. The various devices are coupled by wired or wireless connections 241. A wired or wireless connection 242 couples the devices of cluster 200 with a remote server 250. A variety of outgoing data 251 can be sent from cluster 200 to remote server 250 via wired or wireless connection 242, and remote server 250 can likewise send incoming data 252 to cluster 200 via wired or wireless connection 242.

In FIG. 2, the example encrypted node devices include encrypted node device 201, encrypted node device 202, and encrypted node device X. It can be appreciated that any number of encrypted node devices can be included in cluster 200. The example storage devices include storage device 211, storage device 212, and storage device Y. It can be appreciated that any number of storage devices can be included in cluster 200. The example node devices include node device 221, node device 222, and node device Z. It can be appreciated that any number of node devices can be included in cluster 200. Furthermore, it can be appreciated that cluster 200 is not limited to the various illustrated devices. Any computing devices can be included in cluster 200 in some embodiments. For example, in some embodiments, storage nodes such as illustrated in FIG. 1 can be included in cluster 200. In other embodiments, cluster can 200 comprise an enterprise deployment which is purchased an operated to perform any of a wide variety of computing tasks.

Furthermore, the various devices in cluster 200 can be configured differently. Thus for example, the storage devices 211, 212 . . . Y can include different device types with different capacities. Similarly, the encrypted node devices 201, 202 . . . X and the node devices 221, 222 . . . Z can comprise devices with different processors, different amounts of system memory, and/or different capabilities. In some embodiments, node devices 221, 222 . . . Z can be classified using "tiers" or general levels of capability, where a first tier indicates a first capability level or range of capability, a second tier indicates a second capability level or range of capability, etc. Capability can comprise a measure of processing power or other capabilities such as the ability to handle identified types of operations or operate at identified speeds.

Cluster 200 can be configured to include any of a wide variety of features. For example, a detailed view of node device Z is illustrated in FIG. 2. Node device Z can be equipped with example feature 231, example feature 232, and example feature F. Example features 231, 232 . . . F can include, e.g., software installed at node device Z. Example features 231, 232 . . . F can also optionally be installed at, or otherwise make use of other devices in the cluster 200. Example features 231, 232 . . . F can be licensed to operate at cluster 200. The types of licenses for features 231, 232 . . . F can depend on multiple different variables, such as cluster node count, cluster storage capacity, cluster drive encryption, and/or cluster tier level(s). Aspects of this disclosure relate to identifying features for licensing at a cluster, identifying cluster configuration information, and acquiring the appropriate licenses for the cluster 200, in a manner that reduces the burden on cluster administrators while also optionally surfacing appropriate information and decisions to cluster administrators.

Figure 3:
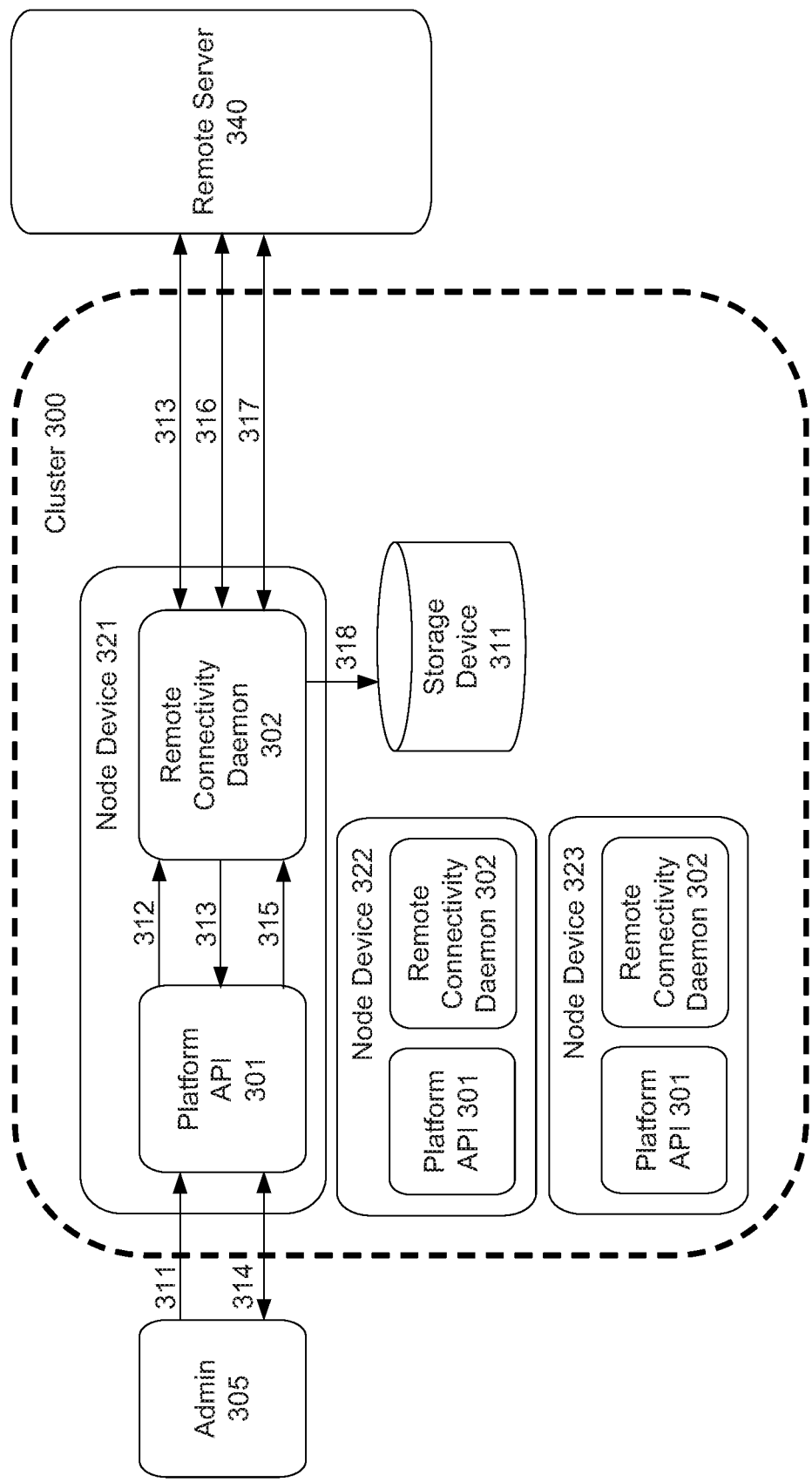
FIG. 3 illustrates example operations to activate cluster features at a cluster of computing devices, in accordance with one or more embodiments described herein.

FIG. 3 illustrates example operations to activate cluster features at a cluster of computing devices, in accordance with one or more embodiments described herein. FIG. 3 includes an example cluster 300 which comprises various example devices, including node device 321, node device 322, node device 323, and storage device 311. FIG. 3 also illustrates an administrator 305, namely, a person interacting with the cluster 300 as described herein, and a remote server 340 with which the cluster 300 can interact as described herein. In some embodiments, the cluster 300 and the various devices illustrated in FIG. 3 can comprise an implementation of the cluster 200 introduced in FIG. 2.

The node devices 321, 322, and 323 each comprise a platform application programming interface (API) 301 and a remote connectivity daemon 302. The platform API 301 can be configured to manage interactions with the administrator 305, perform certain aspects of a cluster feature licensing process, and manage interactions with the remote connectivity daemon 302, as described herein. The remote connectivity daemon 302 can be configured to manage interactions with the platform API 301, perform certain aspects of a cluster feature licensing process, manage interactions with the remote server 340, and store licenses for the cluster 300 at the storage device 311, as described herein.

In FIG. 3, the illustrated operations are performed by the platform API 301 and remote connectivity daemon 302 at node device 321. Cluster technologies can allow the node devices to select a manager to perform certain functions on behalf of the cluster 300. In the illustrated example, the node device 321 can comprise the selected manager node, or otherwise, the node selected to perform the illustrated operations, and therefore, the platform API 301 and remote connectivity daemon 302 at node device 321 can perform the illustrated operations.

In an example set of operations to activate cluster features at cluster 300, the node device 321 can perform operations 311, 312, 313, 314, 315, 316, 317, and 318. At operation 311, platform API 301 can receive, e.g., via a user interface, a license activation request from administrator 305. The license activation request can comprise identifications of features, and/or licenses corresponding to identified features, which the administrator 305 wishes to activate at cluster 300. The platform API 301 can send information from the license activation request to remote connectivity daemon 302, e.g. as request 312.

In response to request 312, the remote connectivity daemon 302 can be configured to facilitate or intermediate an interaction 313 between remote server 340 and platform API 301. Pursuant to interaction 313, remote connectivity daemon 302 can send requested features, requested at 312, to remote server 340. The remote server 340 can be configured to determine which requested features are available to be licensed at cluster 300. The remote server 340 can return a response to remote connectivity daemon 302, the response comprising identifications of approved features. The approved features can include, e.g., all of the requested features, or a subset thereof. The remote connectivity daemon 302 can forward the identifications of approved features to platform API 301.

The platform API 301 can be configured to perform an interaction 314 with the administrator 305, e.g., via a user interface. Pursuant to interaction 314, the platform API 301 can present identifications of approved features to administrator 305, and the administrator 305 can accept or decline to continue with licensing the approved features for installation at cluster 300. If the administrator 305 declines, the operations illustrated in FIG. 3 can be paused or operations 311-314 can be repeated to identify an acceptable approved feature set. If the administrator 305 accepts, the operations can proceed with operation 315.

In response to an administrator 305 acceptance of approved features pursuant to interaction 314, the platform API 301 can be configured to generate an activation file comprising identifications of approved features to be activated at cluster 300. At 315, the platform API 301 can provide the activation file to the remote connectivity daemon 302.

In response to availability of an activation file, the remote connectivity daemon 302 can be configured to perform interaction 316 with remote server 340. Pursuant to interaction 316, the remote connectivity daemon 302 can send the activation file to the remote server 340, and the remote connectivity daemon 302 can receive, in response, an activation token from the remote server 340. The activation token can be used to retrieve licensing file(s) from the remote server 340, wherein the licensing file licenses or otherwise activates features identified in the activation file. Generating a licensing file at the remote server 340 can take an indeterminate amount of time, and so the remote connectivity daemon 302 can use the activation token to retrieve the licensing file(s) when licensing file(s) are ready.

In response to receipt of an activation token, the remote connectivity daemon 302 can be configured to perform interaction 317 with remote server 340. Pursuant to interaction 317, the remote connectivity daemon 302 can periodically poll the remote server 340 for a license file, and the remote connectivity daemon 302 can download the license file when it is available from remote server 340.

In response to receipt of a license file, the remote connectivity daemon 302 can be configured to perform interaction 318 with the storage device 311. The remote connectivity daemon 302 can initiate storage of the license file and/or other license information at the storage device 311. In some embodiments, the storage device 311 can comprise a distributed license config store, and the license file and/or other license information can be stored therein, in order to effectively install or otherwise activate the licensed features at the cluster 300.

Figure 4:
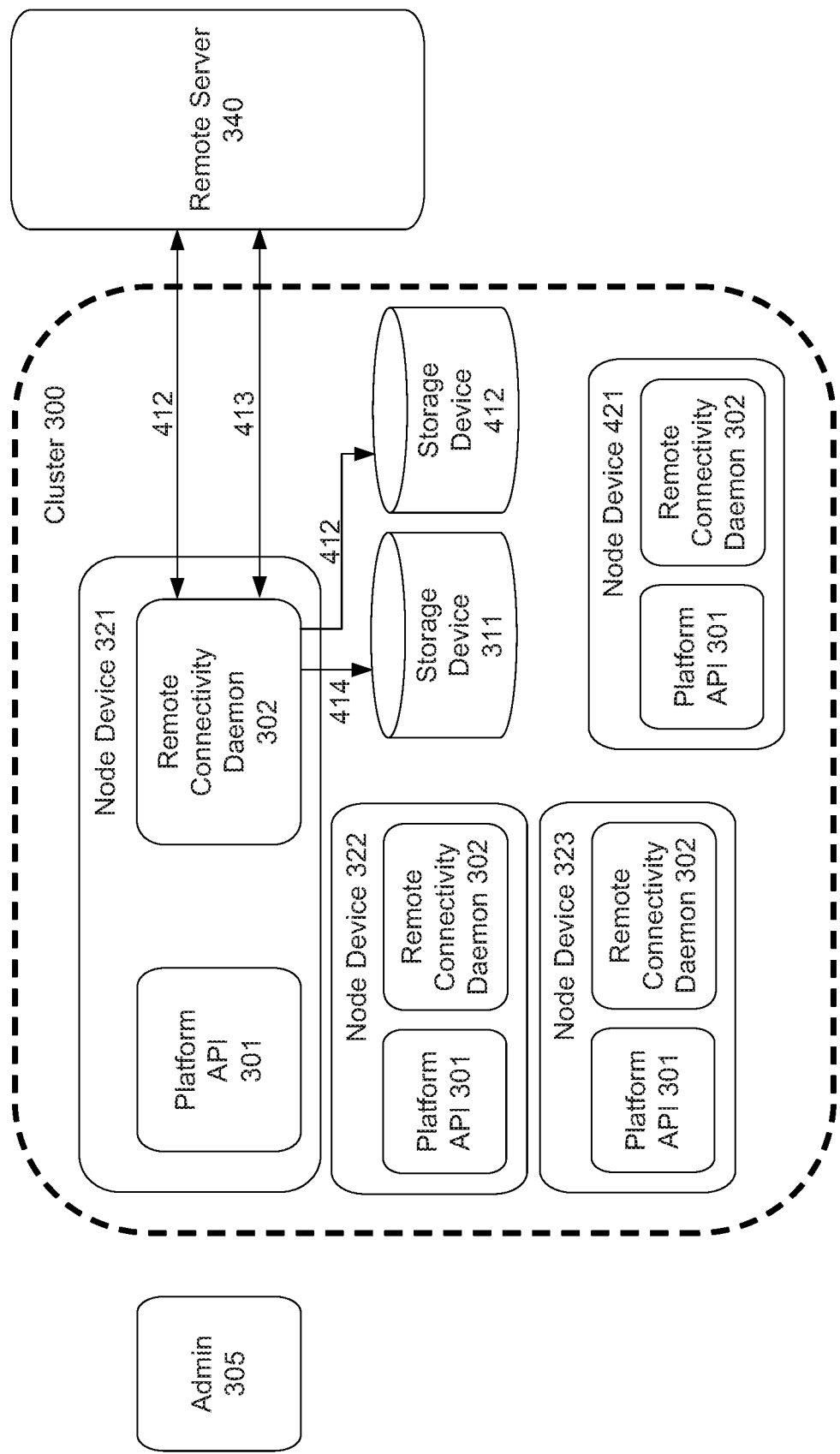
FIG. 4 illustrates example operations to update licenses for cluster features at a cluster of computing devices, in accordance with one or more embodiments described herein.

FIG. 4 illustrates example operations to update licenses for cluster features at a cluster of computing devices, in accordance with one or more embodiments described herein. FIG. 4 includes the example cluster 300, remote server 340, and administrator 305 introduced in FIG. 3, along with various additional components of cluster 300. As in FIG. 3, cluster 300 comprises node device 321, node device 322, node device 323, and storage device 311. A node device 421 and a storage device 412 have been added to cluster 300, for the purpose of illustrating additional aspects of this disclosure.

In an example set of operations to update licenses for cluster features at cluster 300, a cluster configuration can be changed, such as by the addition of a new node device 421 to the cluster 300. The cluster 300 can be configured to detect the configuration change, and the cluster 300 can perform operations 412, 413 and 414 in order to update licenses for cluster features, so that the licenses at cluster 300 are appropriate for the new cluster configuration.

At operation 412, the remote connectivity daemon 302 can be configured to detect a cluster configuration change, such as the addition of new node device 421. In an example embodiment, the detection can be accomplished by reading cluster node config data stored at storage device 412, and comparing the cluster node config data to previously stored cluster node config data, or for example, comparing the cluster node config data to a previously stored activation file or other licensing data. The remote connectivity daemon 302 can be configured to generate an updated activation file for the new cluster configuration, and the remote connectivity daemon 302 can send the updated activation file to the remote server 340. The remote server 340 can optionally return an activation token to the remote connectivity daemon 302.

Operations 413 and 414 can be similar to operations 317 and 318, described in connection with FIG. 3. At operation 413, the remote connectivity daemon 302 can be configured to periodically poll the remote server 340 for a license file, and remote connectivity daemon 302 can download the license file when the license file is available. At operation 414, in response to receipt of a license file, the remote connectivity daemon 302 can be configured to initiate storage of the license file and/or other license information at the storage device 311.

Figure 5:
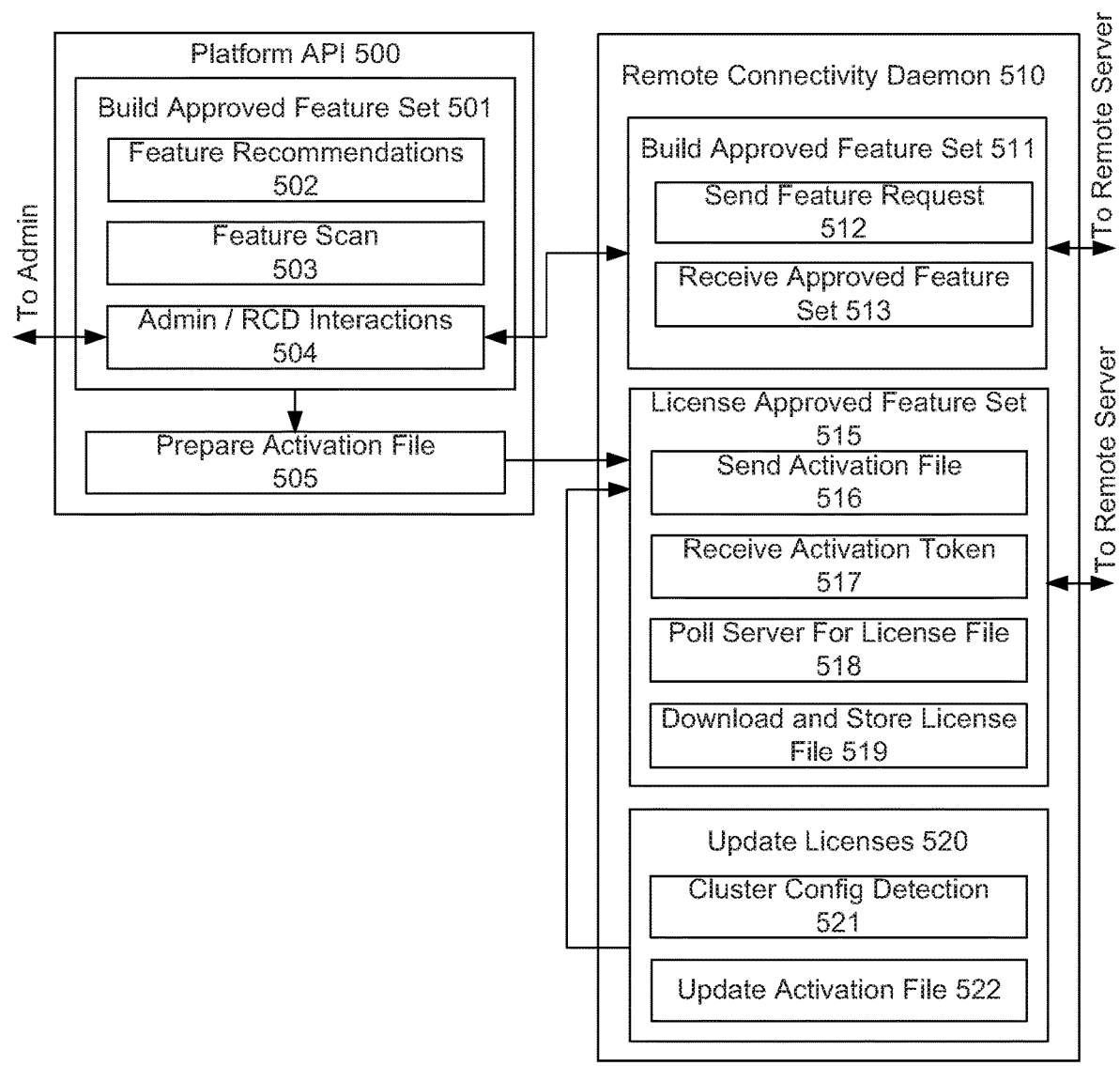
FIG. 5 provides a detailed view of an example platform API and an example remote connectivity daemon, in accordance with one or more embodiments described herein.

FIG. 5 provides a detailed view of an example platform API and an example remote connectivity daemon, in accordance with one or more embodiments described herein. The illustrated example platform API 500 and remote connectivity daemon 510 provide example configurations for the platform API 301 and remote connectivity daemon 302 discussed in connection with FIG. 3 and FIG. 4. It can be appreciated that other configurations for platform API 301 and remote connectivity daemon 302 are also possible and this disclosure is not limited to the configurations illustrated in FIG. 5.

Platform API 500 comprises a group of functions to build an approved feature set, referred to as build approved feature set 501. Build approved feature set 501 can generate a set of approved features to install at a cluster. Build approved feature set 501 can initially identify features via any of a variety of approaches. A set of feature recommendations 502 can optionally be used to identify recommended features for a particular cluster. Feature recommendations 502 can optionally depend on cluster type or known information about the intended use of the cluster. A feature scan 503 can identify, e.g., features that are preinstalled or otherwise already present (although potentially unlicensed) at a cluster. Finally, admin/remote connectivity daemon (RCD) interactions 504 can be used to identify, via interactions with a cluster administrator, the administrator's desired features for the cluster.

After build approved feature set 501 initially identifies features for a cluster, admin/RCD interactions 504 can be used to request approval of the initially identified features. A request can be sent to remote connectivity daemon 510, and remote connectivity daemon 510 can respond with an approved feature set, namely, identifications of those features from the initially identified features which are approved for installation at the cluster. Admin/RCD interactions 504 can present the approved feature set to the administrator for acceptance.

With administrator acceptance, admin/RCD interactions 504 can pass identifications of approved and accepted features to prepare activation file 505. Prepare activation file 505 can prepare an activation file for use in licensing the approved and accepted features. Prepare activation file 505 can optionally detect cluster configuration properties, such as node count and other cluster configuration properties, and such cluster configuration properties can be included in the activation file. Prepare activation file 505 can pass the generated activation file to the remote connectivity daemon 502 for licensing the approved and accepted features at the cluster.

Turning now to the remote connectivity daemon 510, the various functions of the remote connectivity daemon 510 are grouped into three functional groups, including build approved feature set 511, license approved feature set 515, and update licenses 520. Build approved feature set 511 can be configured to cooperate with build approved feature set 501 at platform API 500, in order to obtain remote server approval for initially identified features for the cluster. In this regard, send feature request 512 can send identifications of initially identified features to the remote server, along with a request for approval to install the initially identified features. Additional cluster and/or cluster user information can optionally be included in the request. Receive approved feature set 513 can receive, from the remote server, an approved feature set which indicates which of the initially identified features are approved for installation at the cluster. Build approved feature set 511 can pass the approved feature set back to platform API 500 for acceptance by the cluster administrator.

License approved feature set 515 can be configured to use an activation file to initially obtain an activation token, and subsequently obtain a license for the approved features at the cluster. License approved feature set 515 can include send activation file 516, receive activation token 517, poll server for license file 518, and download and store license file 519. Send activation file 516 can send generated activation files to a remote server. Receive activation token 517 can receive activation tokens returned by the remote server. Poll server for license file 518 can periodically check with the remote server regarding availability of a license file corresponding to the activation token. Download and store license file 519 can download and store a license file for the approved features at the cluster, when such license file becomes available.

Update licenses 520 can be configured to update licenses at a cluster in response to cluster configuration changes, so the licenses at the cluster are appropriate for a current cluster configuration. Update licenses 520 can comprise cluster config detection 521 and update activation file 522. Cluster config detection 521 can compare a current cluster configuration to a previously licensed cluster configuration. Such a comparison can be made in numerous different ways as can be appreciated. In general, current cluster configuration data, as can be stored in a current cluster configuration file, can be compared to prior cluster configuration data, as can be stored in a prior cluster configuration file, a prior activation file, or a prior license file. When the current cluster configuration differs from the prior cluster configuration, cluster config detection 521 can activate the update activation file 522.

Update activation file 522 can generate an updated activation file, including identifications of the features installed at the cluster and updated cluster configuration information. An updated activation file can be supplied to license approved feature set 515, so that license approved feature set 515 can perform its various functions, described above, to obtain an updated license for the cluster.

Figure 6:
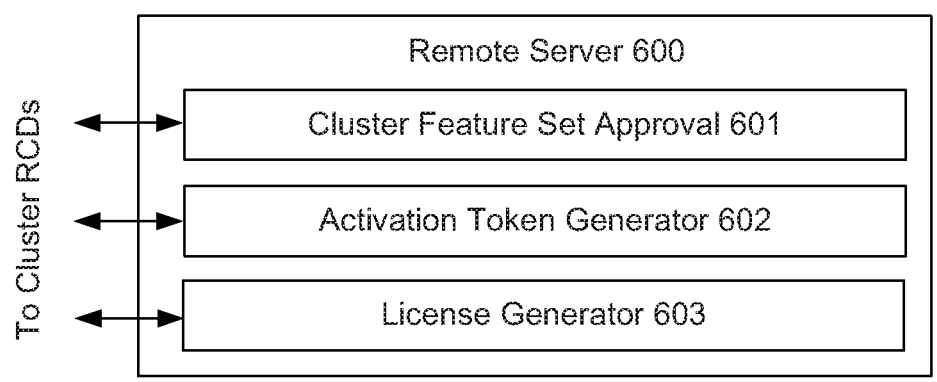
FIG. 6 illustrates an example remote server, in accordance with one or more embodiments described herein.

FIG. 6 illustrates an example remote server, in accordance with one or more embodiments described herein. Example remote server 600 can provide, e.g., a remote server 340 introduced in FIG. 3 and FIG. 4. In some embodiments, remote server 600 can be described herein as a licensing backend or a licensing server. In some embodiments, remote server 600 can comprise a server supported by a manufacturer of cluster hardware, or a server supported by an owner of software features for use at clusters, or a licensing clearinghouse for multiple cluster software features.

Example remote server 600 can comprise a cluster feature set approval 601, an activation token generator 602, and a license generator 603. Each of the illustrated components can be configured to interact with remote connectivity daemons at multiple respective clusters, each cluster being optionally associated with different respective customers, having different respective cluster configurations, and having different respective desired features to be licensed.

The cluster feature set approval 601 can be configured to receive feature identifications from cluster remote connectivity daemons, analyze whether the identified features are available for licensing, and respond with approved features. Cluster feature set approval 601 can optionally analyze cluster configuration information and/or customer information in order to determine whether each feature of a received feature set is licensable at a requesting cluster. Cluster feature set approval 601 can compile a list of approved features, comprising at least one and up to all of the requested features, and cluster feature set approval 601 can return the list of approved features to the requesting remote connectivity daemon.

The activation token generator 602 can be configured to receive activation files from clusters, generate activation tokens corresponding to the activation files, and return the generated activation tokens to requesting clusters. In some embodiments, activation tokens can be configured to temporarily activate features at clusters, so that features can be temporarily activated prior to generating a license file. Activation tokens can include, e.g., digitally signed tokens to activate identified cluster features at an identified cluster. Activation tokens can furthermore include information for use by license generator 603, as described below.

The license generator 603 can be configured to generate license files for clusters. The license generator 603 can optionally begin generating a license file upon generation of an activation token by activation token generator 602, however, generating a license file can entail certain additional checks and certifications which can involve additional time. While the license generator 603 is in the process of generating a license file for a cluster, the license generator 603 can respond to any received polling requests with a message to indicate the license file is not yet ready. After a license file is ready, the license generator 603 can respond to a subsequent polling request from the licensed cluster by sending a generated license file for the licensed cluster. The license file can be generated in part based on information in an activation file, and as such, the license file can include cluster identification information, cluster configuration information, and identifications of licensed features. The license file can be digitally signed by license generator 603, and can include information to activate (license) approved features at a requesting cluster.

Figure 7:
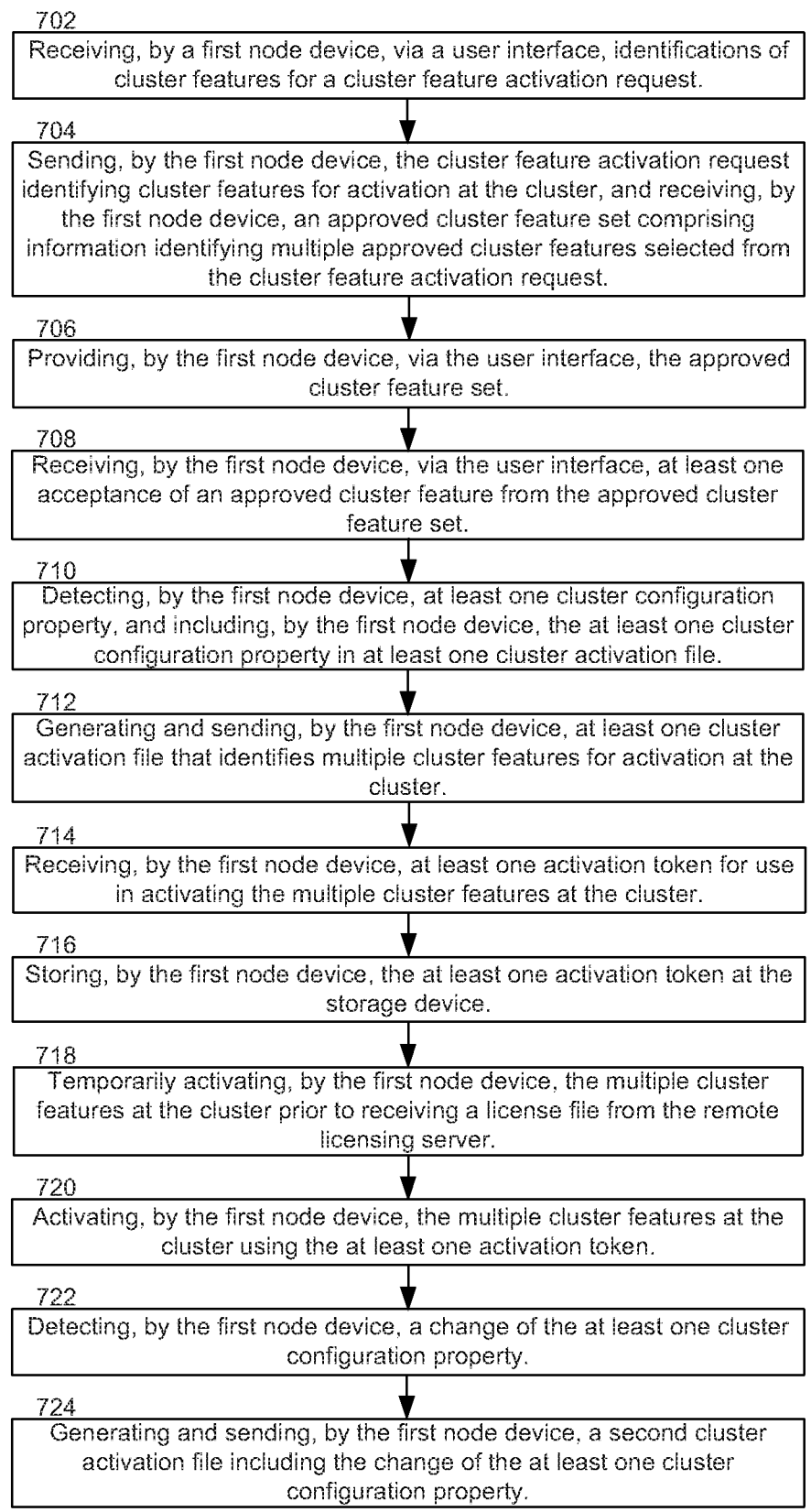
FIG. 7 is a flow diagram of an example, non-limiting computer implemented method to activate cluster features at a cluster of computing devices, in accordance with one or more embodiments described herein.

FIG. 7 is a flow diagram of an example, non-limiting computer implemented method to activate cluster features at a cluster of computing devices, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by a node device 321 such as illustrated in FIG. 3, which can be referred to as a "first node device". At 702, the first node device 321 can receive, via a user interface, identifications of cluster features for a cluster feature activation request. For example, first node device 321 can receive identifications of desired cluster features from administrator 305. At 704, the first node device 321 can send a cluster feature activation request identifying cluster features for activation at the cluster, and the first node device 321 can receive an approved cluster feature set comprising information identifying multiple approved cluster features selected from the cluster feature activation request. For example, first node device 321 can send the cluster feature activation request to remote server 340, and remote server 340 can return the approved cluster feature set to first node device 321. At 706, the first node device 321 can provide, via the user interface, the approved cluster feature set. For example, first node device 321 can present the approved cluster feature set to administrator 305. At 708, the first node device 321 can receive, via the user interface, at least one acceptance of an approved cluster feature from the approved cluster feature set. For example, first node device 321 can receive an administrator 305 acceptance of up to all approved cluster features of the approved cluster feature set. Having identified the cluster features to be activated, the first node device 321 can proceed with acquiring the license(s) for the cluster 300.

At 710, the first node device 321 can detect at least one cluster configuration property, and the first node device 321 can include the at least one cluster configuration property in at least one cluster activation file. The at least one cluster configuration property can comprise, e.g., at least one of: a cluster node count, a cluster storage capacity, and a cluster encrypted node count. Other cluster configuration properties include, e.g., node device tier levels. It can be appreciated that any cluster configuration properties can potentially be relevant to feature licensing and this disclosure is not limited to any particular cluster configuration properties.

At 712, the first node device 321 can generate and send at least one cluster activation file that identifies multiple cluster features for activation at the cluster 300. The multiple cluster features identified in the at least one cluster activation file can comprise, e.g., administrator accepted cluster features of the approved cluster feature set, identified pursuant to blocks 702-708. In addition to cluster feature identifications, the cluster activation file can include cluster configuration properties detected at block 710. An example cluster configuration can generally include at least the first node device 321, a second node device 322, and a storage device 311 which is independent from the first node device 321 and the second node device 322. The first node device 321 can send the cluster activation file to a remote server 340, also referred to herein as a remote licensing server.

At 714, the first node device 321 can receive at least one activation token for use in activating the multiple cluster features at the cluster 300. For example, the first node device 321 can receive an activation token from the remote licensing server 340. At 716, the first node device 321 can store the at least one activation token at the storage device 311. At 718, the first node device 321 can temporarily activate the multiple cluster features at the cluster 300 prior to receiving a license file from the remote licensing server 340. For example, the first node device 321 can optionally use the activation token to temporarily activate the multiple cluster features, i.e., the multiple cluster features identified in the activation file. The activation token can optionally include information required to run the multiple cluster features. The activation token can optionally also include expiration information to set an expiration time after which the activation can be subject to revocation and/or renewal.

At 720, the first node device 321 can activate the multiple cluster features at the cluster using the at least one activation token. For example, activating the multiple cluster features at the cluster 300 using the at least one activation token can comprise polling the remote licensing server 340 to check whether a license file is ready, sending the at least one activation token to the remote licensing server 340, and receiving a license file from the remote licensing server 340. The license file can provide at least a longer licensed duration of the multiple cluster features than temporarily authorized by the activation token. After the multiple cluster features are licensed at cluster 300, the cluster can operate normally, while license updates to accommodate cluster configuration changes can optionally be handled in the background, with reduced or eliminated administrator 305 involvement.

At 722, the first node device 321 can detect a change of the at least one cluster configuration property. In an example embodiment, detecting the change of the at least one cluster configuration property can comprise comparing cached cluster configuration information, as can be cached at one or more node devices 321, 322, 323, to stored cluster configuration information, as can be stored for example at storage device 311. The change of the at least one cluster configuration property can comprise, e.g., an addition or a subtraction of a node from a cluster node count. Other hardware or software additions and subtractions can also be detected as relevant changes of a cluster configuration property. At 724, the first node device 321 can generate and send a second cluster activation file including the change of the at least one cluster configuration property. For example, first node device 321 can send an updated cluster activation file to the remote licensing server 340.

Figure 8:
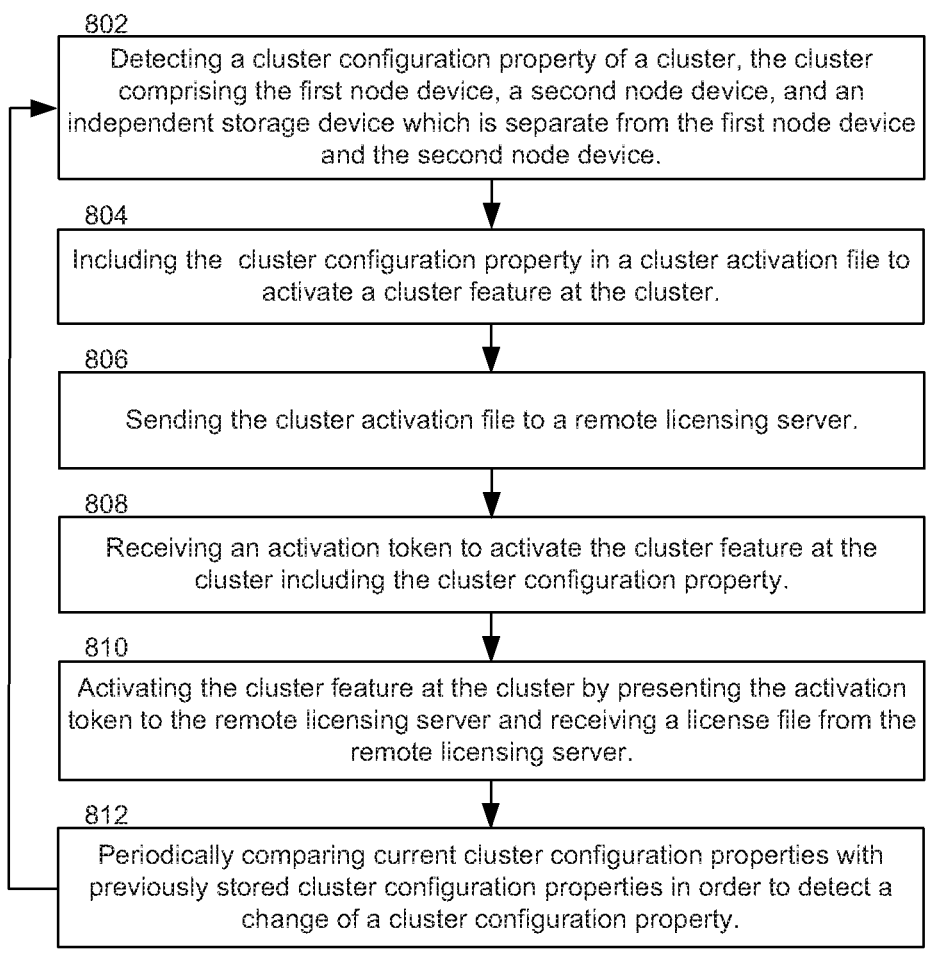
FIG. 8 is a flow diagram of an example, non-limiting computer implemented method to update licenses for cluster features at a cluster of computing devices, in accordance with one or more embodiments described herein.

FIG. 8 is a flow diagram of an example, non-limiting computer implemented method to update licenses for cluster features at a cluster of computing devices, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be reordered, combined, removed or supplemented with other operations in some embodiments.

In an embodiment, the method illustrated in FIG. 8 can be performed by a node device 321 such as illustrated in FIG. 4, which can be referred to as a first node device. At 802, the first node device 321 can detect a cluster configuration property of a cluster 300. The cluster can comprise, e.g., the first node device 321, a second node device 322, and an independent storage device 311 which is separate from the first node device 321 and the second node device 322. Of course, the cluster 300 can and typically will comprise numerous other elements, as can be appreciated, and the illustrated cluster 300 is simplified to facilitate this description. The detected cluster configuration property can comprise, e.g., a cluster node count, a tier associated with a node device in the cluster 300 wherein the tier is indicative of capabilities of the node device, a cluster 300 storage capacity, a cluster 300 encrypted node count, and/or any other cluster configuration property. Detecting the cluster configuration property can optionally comprise detecting a change of the cluster configuration property, which can be detected pursuant to block 812.

At 804, the first node device 321 can include the cluster configuration property in a cluster activation file to activate a cluster feature at the cluster 300. For example, first node device 321 can include the detected cluster configuration property, detected at block 802, in an updated cluster activation file to activate a cluster feature at the cluster 300. When the cluster feature is already activated at the cluster 300, activating the cluster feature at block 804 can comprise maintaining an activated/licensed status for the cluster feature.

At 806, the first node device 321 can send the cluster activation file to a remote licensing server 340. At 808, the first node device 321 can receive an activation token to activate the cluster feature at the cluster 300 including the cluster configuration property. The activation token can be issued by the remote licensing server 340 in order to update the cluster 300 license in view of the detected/changed cluster configuration property. At 810, the first node device 321 can activate and/or maintain an activation of the cluster feature at the cluster 300 by presenting the activation token to the remote licensing server 340 and receiving a license file from the remote licensing server 340. Features described herein such as temporary activation and polling the remote licensing server 340 can also be included in FIG. 8 in some embodiments.

At 812, the first node device 321 can periodically compare current cluster configuration properties with previously stored cluster configuration properties in order to detect a change of a cluster configuration property. For example, the first node device 321 can periodically compare cached cluster configuration properties to properties stored in a cluster config file or database. If a change of cluster configuration is detected, block 812 can return to block 802.

Figure 9:
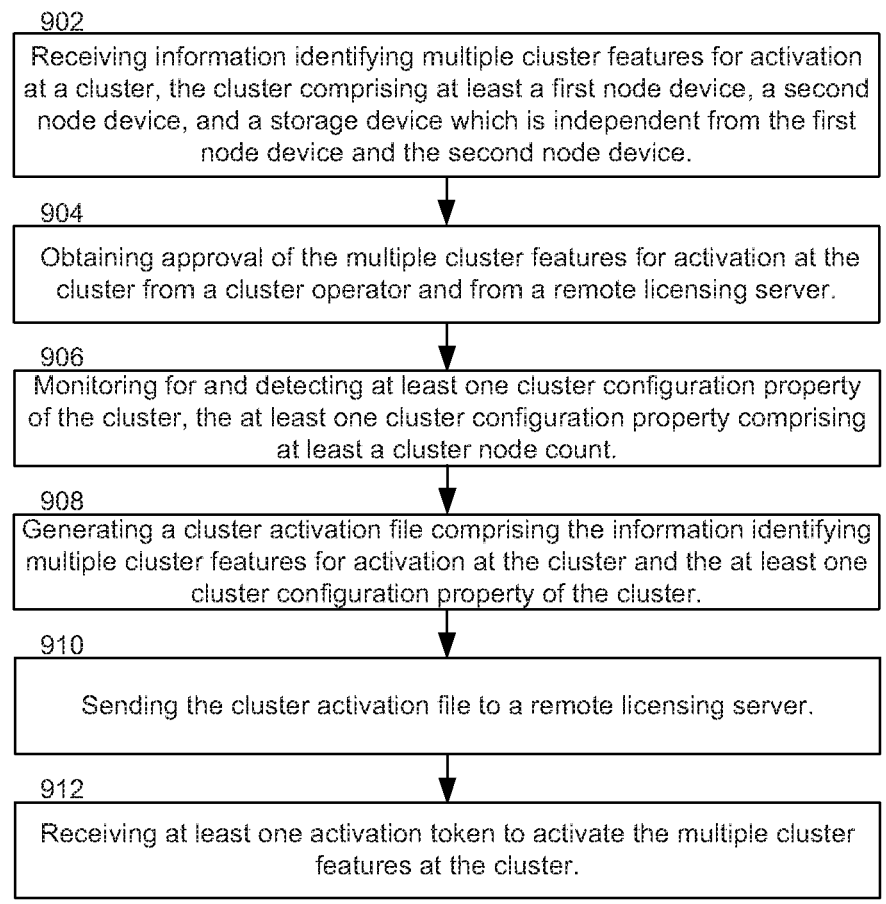
FIG. 9 is a flow diagram of an example, non-limiting computer implemented method to monitor cluster configuration properties and license cluster features, in accordance with one or more embodiments described herein.

FIG. 9 is a flow diagram of an example, non-limiting computer implemented method to monitor cluster configuration properties and license cluster features, in accordance with one or more embodiments described herein. The blocks of the illustrated method represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by a node device 321 such as illustrated in FIG. 3 and FIG. 4, or optionally by any of the node devices in a cluster 300, or by multiple cooperating devices at the cluster 300. At 902, the node device 321 can receive information identifying multiple cluster features for activation at a cluster 300, the cluster 300 comprising at least a first node device 321, a second node device 322, and a storage device 311 which is independent from the first node device 321 and the second node device 322. For example, the node device 321 can receive feature identifications of desired features from administrator 305. At 904, the node device 321 can obtain approval of the multiple cluster features for activation at the cluster 300 from a cluster operator (administrator 305) and from a remote licensing server 340. At 906, the node device 321 can monitor for and detect at least one cluster configuration property of the cluster 300, the at least one cluster configuration property comprising at least a cluster node count, and/or other cluster configuration properties as described herein.

At 908, the node device 321 can generate a cluster activation file comprising the information obtained at blocks 902 and 904, namely, the information identifying multiple cluster features for activation at the cluster 300 and the at least one cluster configuration property of the cluster 300. At 910, the node device 321 can send the cluster activation file to a remote licensing server 340. At 912, the node device 321 can receive at least one activation token to activate the multiple cluster features at the cluster 300. The various techniques described in connection with FIG. 7 and FIG. 8 can also be included in FIG. 9, as can be appreciated.

Figure 10:
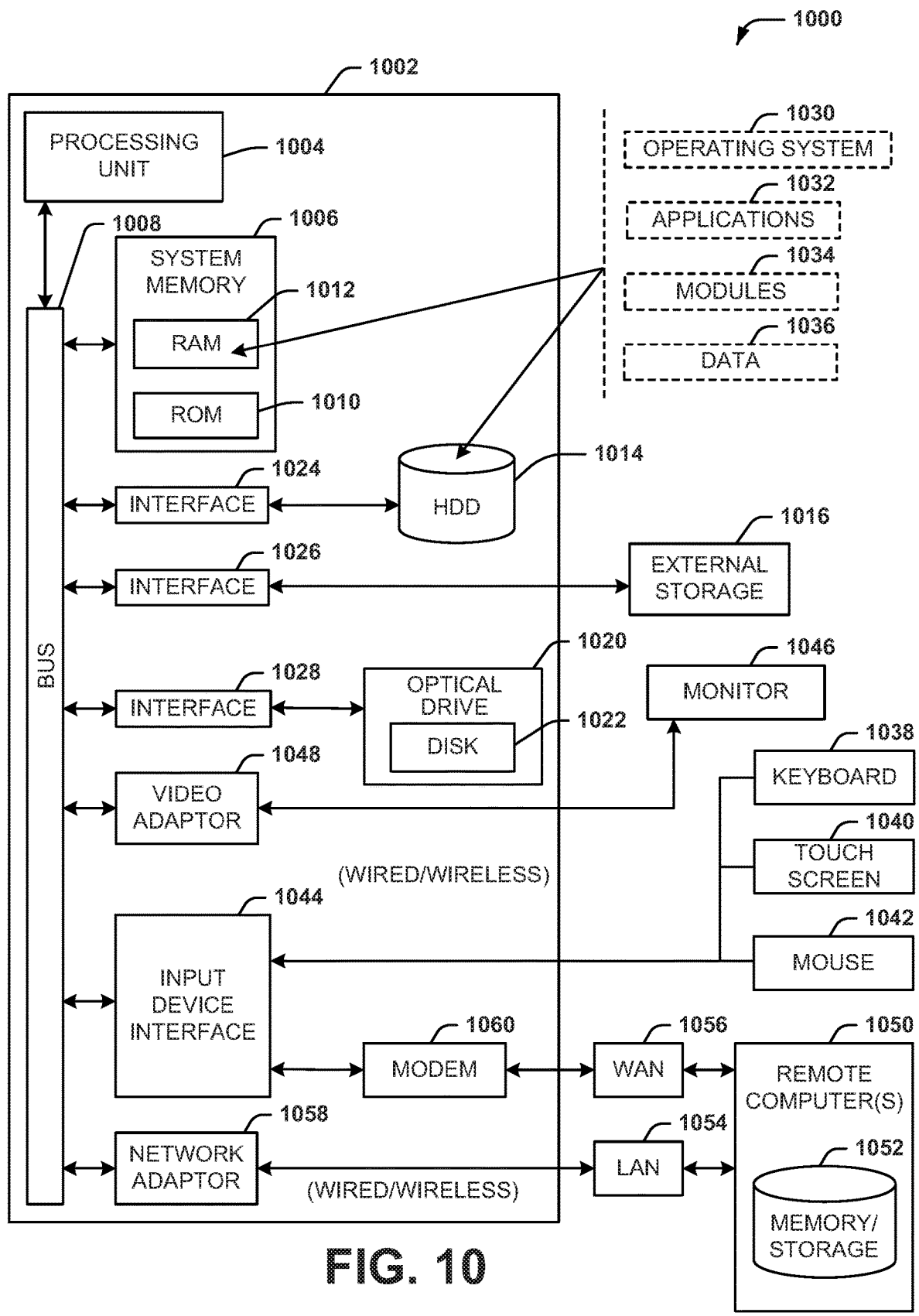
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating and sending, by a first node device comprising a processor, at least one cluster activation file to a licensing server, wherein the cluster activation file identifies multiple cluster features for activation at a cluster, the cluster comprising at least the first node device, a second node device, and a storage device;
receiving, by the first node device from the licensing server, at least one activation token for use in activating the multiple cluster features at the cluster, wherein the activation token is digitally signed and comprises expiration information associated with the activation token;
storing, by the first node device, the at least one activation token at the storage device; and
first using the at least one activation token to temporarily activate, by the first node device, the multiple cluster features at the cluster; and
subsequent to temporarily activating the multiple cluster features, second using the at least one activation token to activate the multiple cluster features at the cluster, wherein the second using the at least one activation token to activate the multiple cluster features comprises:
polling the licensing server to determine whether a license file is ready;
sending the at least one activation token to the licensing server; and
receiving the license file from the licensing server, wherein the license file activates the multiple cluster features for a longer duration than a duration based on the expiration information associated with the activation token.

2. The method of claim 1, wherein the licensing server comprises a remote licensing server that is remote from the cluster.

3. The method of claim 1, further comprising sending, by the first node device, a cluster feature activation request that identifies cluster features for activation at the cluster, and receiving, by the first node device, an approved cluster feature set comprising information identifying multiple approved cluster features, wherein the multiple approved cluster features are selected from among the cluster features in the cluster feature activation request, and wherein the multiple cluster features identified in the at least one cluster activation file comprise cluster features of the approved cluster feature set.

4. The method of claim 3, further comprising:
receiving, by the first node device, via a user interface, identifications of cluster features for the cluster feature activation request;
providing, by the first node device, via the user interface, the approved cluster feature set; and
receiving, by the first node device, via the user interface, at least one acceptance of an approved cluster feature from the approved cluster feature set.

5. The method of claim 1, further comprising detecting, by the first node device, at least one cluster configuration property, and including, by the first node device, the at least one cluster configuration property in the at least one cluster activation file.

6. The method of claim 5, wherein the at least one cluster activation file is at least one first cluster activation file, and further comprising:
detecting, by the first node device, a change of the at least one cluster configuration property; and
generating and sending, by the first node device, a second cluster activation file comprising the change of the at least one cluster configuration property.

7. The method of claim 6, wherein the at least one cluster configuration property comprises a cluster node count, and wherein the change of the at least one cluster configuration property comprises an addition or a subtraction of a node from the cluster node count.

8. The method of claim 6, wherein the detecting the change of the at least one cluster configuration property comprises comparing cached cluster configuration information to stored cluster configuration information.

9. The method of claim 5, wherein the at least one cluster configuration property comprises at least one of a cluster node count, a cluster storage capacity, and a cluster encrypted node count.

10. A first node device, comprising:
at least one processor; and
at least one memory that stores executable instructions that, when executed by the at least one processor, facilitate performance of operations, comprising:
detecting a cluster configuration property of a cluster, the cluster comprising the first node device, a second node device, and a storage device;
including the cluster configuration property in a cluster activation file to activate a cluster feature at the cluster;
sending the cluster activation file to a remote licensing server;
receiving, from the remote licensing server, an activation token to activate the cluster feature at the cluster, wherein the activation token is digitally signed and comprises expiration information associated with the activation token;
first using the activation token to temporarily activate the cluster feature at the cluster, resulting in a temporary activation of the cluster feature; and
subsequent to the temporary activation of the cluster feature, second using the activation token to activate the cluster feature at the cluster, wherein the second using the activation token to activate the cluster features comprises:
polling the remote licensing server to check whether a license file is ready;
sending the activation token to the remote licensing server; and
receiving the license file from the remote licensing server, wherein the license file activates the cluster feature for a longer amount of time than an amount of time based on the expiration information associated with the activation token.

11. The device of claim 10, wherein the cluster configuration property comprises a cluster node count.

12. The device of claim 10, wherein the cluster configuration property comprises a tier associated with a node device in the cluster, and wherein the tier is indicative of capabilities of the node device in the cluster.

13. The device of claim 10, wherein the cluster configuration property comprises at least one of a cluster storage capacity and a cluster encrypted node count.

14. The device of claim 10, wherein the detecting the cluster configuration property comprises detecting a change of the cluster configuration property.

15. The device of claim 14, wherein the operations further comprise periodically comparing current cluster configuration properties with previously stored cluster configuration properties in order to detect the change of the cluster configuration property.

16. A non-transitory machine-readable medium, comprising executable instructions that, when executed by a processor, facilitate performance of operations, comprising:

receiving information identifying multiple cluster features for activation at a cluster, the cluster comprising at least a first node device, a second node device, and a storage device;

monitoring for and detecting at least one cluster configuration property of the cluster, the at least one cluster configuration property comprising at least a cluster node count;

generating a cluster activation file comprising the information identifying multiple cluster features for activation at the cluster and the at least one cluster configuration property of the cluster;

sending the cluster activation file to a remote licensing server;

receiving, from the remote licensing server, at least one activation token to activate the multiple cluster features at the cluster, wherein the activation token is digitally signed and comprises expiration information associated with the activation token;

first using the activation token to temporarily activate the multiple cluster features at the cluster, resulting in a temporary activation of the multiple cluster features; and subsequent to temporarily activating the multiple cluster features, second using the activation token to activate the multiple cluster features at the cluster, wherein the second using the activation token to activate the multiple cluster features comprises:

polling the remote licensing server to check whether a license file is ready;

sending the activation token to the remote licensing server; and receiving the license file from the remote licensing server, wherein the license file activates the multiple cluster features for longer than a duration associated with the temporary activation.

17. The non-transitory machine-readable medium of claim 16, wherein the operations further comprise monitoring for and detecting a change of the at least one cluster configuration property of the cluster.

18. The non-transitory machine-readable medium of claim 17, wherein the operations further comprise generating a second cluster activation file comprising the change of the at least one cluster configuration property, and sending the second cluster activation file to the remote licensing server.

19. The non-transitory machine-readable medium of claim 17, wherein the at least one cluster configuration property comprises a cluster node count, and wherein the change of the at least one cluster configuration property comprises an addition or a subtraction of a node from the cluster node count.

20. The non-transitory machine-readable medium of claim 16, wherein the at least one cluster configuration property comprises at least one of a cluster node count, a cluster storage capacity, a cluster encrypted node count, or a tier associated with a node device in the cluster.

\* \* \* \* \*